Aug. 11, 1931.  D. H. KOCH ET AL  1,818,261

COUPLING

Filed Oct. 14, 1927

INVENTOR
Dick H. Koch
Ira T. Slaton
BY
ATTORNEY

Patented Aug. 11, 1931

1,818,261

UNITED STATES PATENT OFFICE

DICK H. KOCH AND IRA T. SLATON, OF COFFEYVILLE, KANSAS

COUPLING

Application filed October 14, 1927. Serial No. 226,123.

Our invention relates to couplings, and more particularly to connectors for sucker rods and the like, the principal objects of the invention being to connect rod sections securely, to latch the rod sections in connected relation and to protect the connecting means for smooth operation when the rods are to be disconnected. Further objects include the provision of easily and quickly connected and disconnected coupling means not subject to disconnection upon rotation of a rod section, means for enclosing the joint, and means for sealing the closure for the joint.

In accomplishing these and other objects of the invention we have provided improved details of structure, the preferred forms of which are illustrated in the accompanying drawings, wherein.

Figure 1:
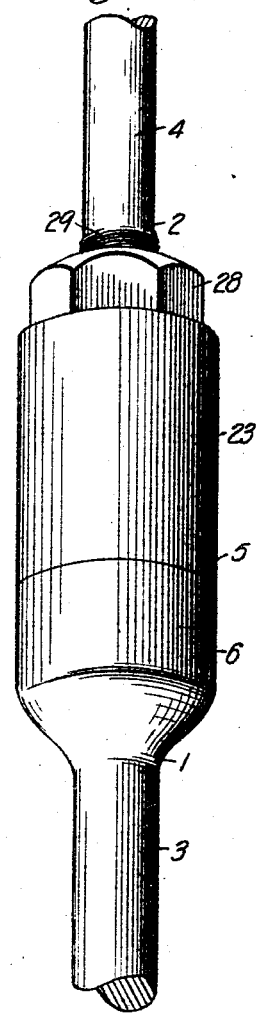
Fig. 1 is a perspective view of a coupling embodying our invention adapted to connect rod sections.
Figure 2:
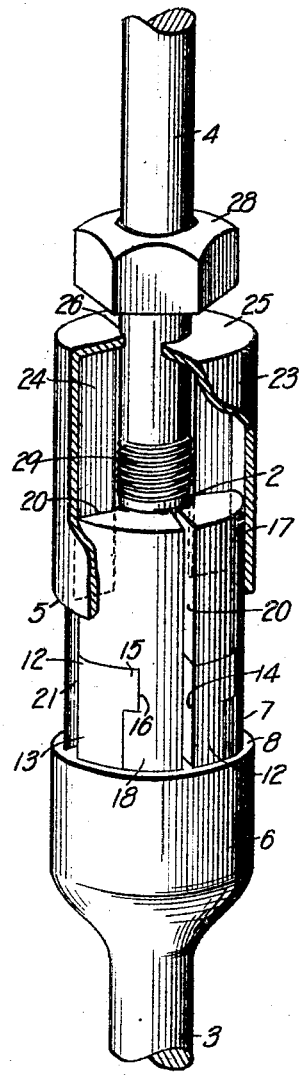
Fig. 2 is a similar view showing joint-retaining members partly withdrawn, a sleeve member being broken away the better to illustrate rod structure.
Figure 3:
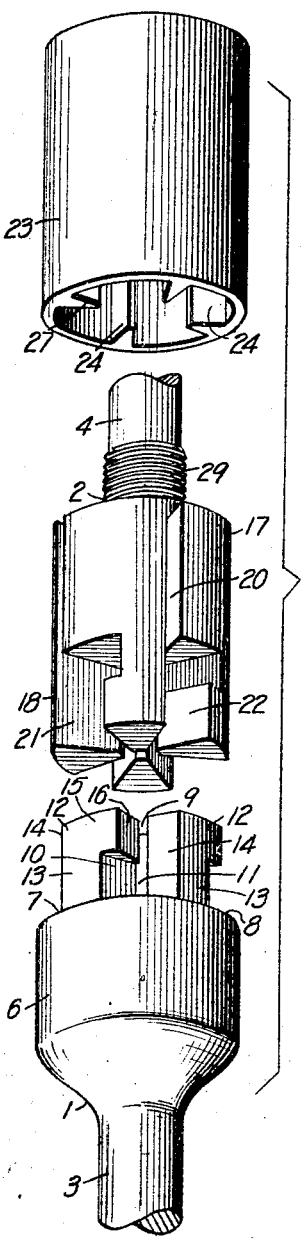
Fig. 3 is a detailed perspective view of connector elements shown in detached position.
Figure 4:
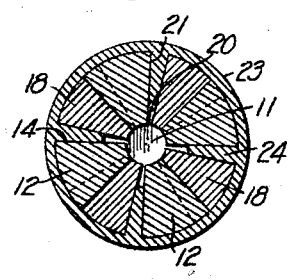
Fig. 4 is a cross section of the joint formed by the connector elements in coupling position.

Referring in detail to the drawings:

The invention is illustrated as adapted to the connecting of adjacent ends 1 and 2, being respectively the upper and lower ends, of sucker rod sections 3 and 4, though the elements to be connected may consist of shafts or pipe, and may be positioned horizontally or the relation of the ends may be reversed. The meeting ends are connected by a bayonet joint generally designated 5 which is preferably comprised of portions of rod sections and will be particularly described. The upper end 1 of the rod section 3 is enlarged to provide a boss portion 6 and a joint element 7 of less diameter than the boss portion, whereby an annular shoulder 8 of the boss portion is produced. The joint element 7 is provided with vertical radial slots 9 relatively wide at the periphery of the joint element and with transverse notches 10 extending laterally from the vertical slots, and an axial bore 11, whereby axial projections constituting segmental jaw members 12 substantially triangular in cross section and arranged in a circle are formed at the extremities of the rod section; each jaw member comprising a body portion 13 having a vertical wall 14 and a flange 15 having a vertical face 16 spaced by one of the relatively wide vertical slots 9 from the vertical wall 14 of an adjacent jaw member.

The lower end 2 of the rod section 4 also has an enlarged portion 17, and the extremity thereof is formed to provide the complementary bayonet joint element 18 having jaw members adapted to enter the slots 9 longitudinally and through rotation of the rod sections relative to each other engage the jaws of the rod section 3. The structure of the lower end 2 differs from that of the mating upper end 1, however, in that the bayonet joint portion is of the same diameter as the enlarged portion 17 and the enlarged portion is slotted to provide narrow radial slots 20 tapering inwardly, one wall of each of said slots 20 being an extension of the vertical wall 21 of a jaw member of the joint element 18. The formed ends 1 and 2 are adapted for connecting the bayonet joint elements, and vertical radial continuous slots 22 extending through the enlarged portion 17 and joint element 18 of rod section 4, and joint element 7 of rod section 3, when the joint elements are in joint-forming position, are provided to constitute keyways to receive keys and latching elements now to be described.

A sleeve element 23 comprises a keying and enclosing member having wedge-shaped longitudinal ribs or keys 24 projecting inwardly on radii of the sleeve and adapted to slide in the slots 22, and a closure or bearing head 25 provided with an opening 26 for loose mounting on the rod section 4. The sleeve is slidable vertically over the assembled joint elements, the keys being beveled at their lower ends as at 27 for easy entrance to the slots, and sliding in the slots. The sleeve is stopped by engagement of its lower edge with the shoulder 8 of the boss 6 when the bearing head 25 has advanced to be substantially engaged with the upper end of the element 17. The sleeve is retained in joint-covering position by a nut 28 slidable on the rod section 4 and engageable with an upset threaded portion 29 of the rod section adjacent the enlarged portion 17 the exterior diameter of the threaded portion being greater than the exterior diameter of the adjacent smooth portion of the rod section.

The elements having been provided as described, a sleeve element and a nut being loosely assembled with an upper rod section, the upper rod section is connected to a lower rod section by extending its jaws into the vertical slots of the lower section, rotating the rods with reference to each other, and so seating the bayonet joint elements, to form a functioning bayonet joint, vertical slots being produced into which the keys of the sleeve member pass when the sleeve is moved over the joint elements to lock the joint elements against rotation and unjointing. The nut is moved into engagement with the upset threaded portion, and is able to engage the same because the diameter of the threaded portion at the roots of the threads is greater than or equal to the diameter of the unthreaded portion of the rod and impresses the sleeve against the shoulder of the boss to seal the sleeve in joint-covering position and prevent dislocation of the joint under tortional stresses of the rod sections.

The joint may be easily disconnected and the rod sections uncoupled, by releasing the nut, displacing the sleeve, and moving the rod sections to release the bayonet joint elements from coupling position.

What we claim and desire to secure by Letters Patent is:

1. In a device of the character described, separate rod sections having cylindrical heads of different diameter, one of said heads having spaced longitudinal jaws inset from the periphery of its head to form a seat, the other head having spaced longitudinal jaws cooperative with the first named jaws to form a bayonet joint, the smaller head having longitudinal slots extending from the bases of its jaws, a sleeve slidable over the smaller head and said jaws and stopped by said seat and having internal radial keys slidable in said slots, for retaining the jaws in interlocked relation, and means on the rod section having the smaller head movable toward and away from the sleeve and engageable with said section for positively retaining the sleeve in functional position.

2. In combination with separate rod sections having cylindrical heads of different diameter, one of said heads having spaced longitudinal jaws inset from the periphery of its head to form a stop shoulder, the other head having spaced longitudinal jaws cooperative with the first named jaws to form a bayonet joint, the smaller head having longitudinal slots extending from the bases of its jaws, a sleeve slidable over the smaller head and said jaws to said shoulder and having internal radial keys slidable in said slots, upset threads on the rod section having the smaller head adjacent the head thereof, said threads having greater external diameter than the adjacent portion of the section, and a nut on said rod section slidable thereon into engagement with the threads for locking the sleeve in functional position.

3. In a coupling, separate rod sections one having a head and spaced jaws, the other section having a head and jaws co-operative with the first named jaws to form a bayonet joint having keyways, one section having threads adjacent its head upset to receive a nut, a sleeve slidable over the heads of the respective rod sections having keys slidable in the keyways for retaining the jaws in locked relation, and a nut slidable on the threaded rod section and engageable with said threads and the sleeve to anchor the sleeve in locking position.

4. In combination with separate rod sections having co-operative interlockable joint members, a sleeve slidable over the members and having a rib movable into joint latching position, a flange on one end of the sleeve, one section having an upset threaded portion, and a nut slidable on said rod section, into engagement with said threaded portion to engage said flange and anchor the sleeve in joint latching position.

In testimony whereof we affix our signatures.

DICK H. KOCH.
IRA T. SLATON.